(12) United States Patent
Zack et al.

(10) Patent No.: US 6,876,163 B2
(45) Date of Patent: Apr. 5, 2005

(54) DC MOTOR HAVING A BRAKING CIRCUIT

(75) Inventors: Gary E. Zack, Novi, MI (US); Charlie Richlie, Northville, MI (US); Chung H. Peng, Riverview, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/413,252

(22) Filed: Apr. 14, 2003

(65) Prior Publication Data

US 2004/0066159 A1 Apr. 8, 2004

Related U.S. Application Data

(60) Provisional application No. 60/415,888, filed on Oct. 3, 2002.

(51) Int. Cl.[7] .................................................. H02K 7/10
(52) U.S. Cl. ........................ 318/362; 318/376; 318/366
(58) Field of Search ................................ 318/362, 376, 318/366, 139, 381

(56) References Cited

U.S. PATENT DOCUMENTS

| 3,594,768 | A | * | 7/1971 | Harris et al. ................. 340/528 |
| 4,314,186 | A | | 2/1982 | Gille et al. |
| 4,370,692 | A | * | 1/1983 | Wellman et al. ............ 361/109 |
| 4,607,242 | A | | 8/1986 | Cozzie |
| 4,908,587 | A | | 3/1990 | Davcev |
| 5,012,047 | A | | 4/1991 | Dohya |
| 5,982,250 | A | | 11/1999 | Hung et al. |
| 6,072,292 | A | * | 6/2000 | Uchiyama et al. .......... 318/376 |
| 6,160,463 | A | | 12/2000 | Arakawa et al. |
| 6,346,867 | B2 | | 2/2002 | Arakawa et al. |
| 6,356,170 | B1 | | 3/2002 | Arakawa et al. |
| 6,400,241 | B1 | | 6/2002 | Ulian et al. |
| 6,504,691 | B1 | * | 1/2003 | Matsui et al. .................. 361/38 |

FOREIGN PATENT DOCUMENTS

| GB | 2 273 373 | 6/1994 |
| GB | 2 311 424 | 9/1997 |

OTHER PUBLICATIONS

JB Guiot, DCS AG, Allschwil, Switzerland, "Circuit forms dc-motor switch with brake", EDN Magazine, Jan. 10, 2002, p. 87.

* cited by examiner

*Primary Examiner*—Karen Masih
(74) *Attorney, Agent, or Firm*—Brinks Hofer Gilson & Lione

(57) ABSTRACT

A circuit for controlling a motor's operation is disclosed. The circuit includes a relay and a motor braking circuit portion. The relay selectively interconnects a voltage source with one of a braking terminal and a motor terminal. The motor braking circuit portion has a motor brake switch connected on a first switch side to the motor terminal and a second switch side to the electrical ground. The brake switch is activated to brake the motor when the relay interconnects the voltage source with the braking terminal.

16 Claims, 2 Drawing Sheets

DC MOTOR HAVING A BRAKING CIRCUIT

CROSS-REFERENCE TO RELATED APPLICATIONS

The present invention claims priority to U.S. Provisional Application Ser. No. 60/415,888 filed on Oct. 3, 2002, entitled "DC Motor Having A Braking FET Circuit Design."

TECHNICAL FIELD

This invention relates to systems and methods for dynamically braking a DC permanent magnet motor.

BACKGROUND

Single pole double throw (Form C) relays are often used to run and dynamically brake permanent magnet motors in applications such as wiper control modules. In this type of application the moving contact is connected to the motor, the normally open contact (N/O) is connected to battery and used to provide power to run the motor, and the normally closed contact (N/C) is used to ground the motor for dynamic braking. In applications such as interval windshield wiper control where the motor may be started and stopped as often as once per second, degradation of the relay can become a durability issue. This is particularly true of the N/C contact since it is more prone to bouncing than the N/O contact. The effect of N/C contact bounce is exacerbated in this case due to the inductive nature of the dynamic braking load, the fact that there is little clean up arc and the fact that the current decays to zero before the N/C contacts are opened. The combined effect results in a high degree of arcing and damage to the N/C contact including severe material transfer and pitting and in some cases sticking. Under these conditions the N/C contact exhibits substantially more degradation than the N/O contact and becomes the weak link in the design making it difficult to attain the desired number of cycles in the usage profile.

SUMMARY

In the Braking FET design of the present invention, the Form C relay is reconfigured with the battery connected to the moving contact, the motor to the N/O contact and a FET braking circuit to the N/C contact. In this design the N/O contact still provides the current to start and run the motor however the weaker N/C contact is only required to control the braking FET gate drive. Since the gate drive of the FET Braking circuit does not present an inductive load, repeated arcing at the N/C contact caused by bouncing is eliminated. This results in the elimination of N/C contact material transfer, pitting and sticking and the associated durability issues. In addition since the FET itself cannot arc, all arcing associated with dynamic braking of the inductive motor load is eliminated resulting in greatly reduced electromagnetic emissions during operation of the N/C contact. In summary the Braking FET design provides substantially reduced electromagnetic emissions along with greatly improved relay durability with very little added cost. Relay life in this configuration is limited by mechanical wear out as opposed to contact degradation.

In an embodiment of the present invention, a circuit for controlling a motor's operation is provided. The circuit includes a relay and a motor braking circuit portion. The relay selectively interconnects a voltage source with a braking terminal or the motor terminal. The motor braking circuit has a motor brake switch connected on a first switch side to the motor terminal and a second switch side to the electrical ground. The brake switch is activated to brake the motor when the relay interconnects the voltage source with the braking terminal.

In another embodiment of the present invention, the second motor terminal is connected to the electrical ground.

In yet another embodiment of the present invention, the relay is a form C relay.

In yet another embodiment of the present invention, the brake switch is a semiconductor device.

In yet another embodiment of the present invention, a control input of the semiconductor device is selectively connected to the voltage source and to the electrical ground.

In yet another embodiment of the present invention, a filter circuit is interconnected between the voltage source and the motor brake switch, and includes a resistor in electrical series connection with the brake switch and a capacitor in parallel connection with the brake switch.

In still another embodiment of the present invention, comprises a fault protection circuit, in connection with the first motor terminal and the voltage source, and includes a diode and a resistive load, wherein the diode and the resistive load are in electrical series connection between the first motor terminal and the voltage source.

In still another embodiment of the present invention, the brake switch is a field effect transistor, the field effect transistor having a gate, a drain, and a source.

In still another embodiment of the present invention, the gate of the field effect transistor is selectively connected to the voltage source and to the electrical ground.

In still another embodiment of the present invention, the drain of the field effect transistor is connected to the first motor terminal.

In yet another embodiment of the present invention, the source of the field effect transistor is connected to the electrical ground.

In a further embodiment of the present invention, comprises a first diode, in electrical connection with the first motor terminal and the gate to prevent deactivation of the field effect transistor.

In yet another embodiment of the present invention, wherein a voltage limiting circuit for setting an active clamp voltage for the field effect transistor and preventing excessive gate voltage for the field effect transistor.

In yet another embodiment of the present invention, the voltage limiting circuit includes two diodes in electrical series connection between the first motor terminal and the gate of the field effect transistor.

In still another embodiment of the present invention, a filter circuit is interconnected between the voltage source and the motor brake switch.

In still another embodiment of the present invention, comprises a deactivation circuit in parallel electrical connection with the filter circuit, which includes a diode and a resistive load, the diode is in electrical series connection with the resistive load.

These and other aspects and advantages of the present invention will become apparent upon reading the following detailed description of the invention in combination with the accompanying drawings.

DETAILED DESCRIPTION

In many applications using DC permanent magnet motors, it is necessary to stop the motor precisely. A typical application of this type is an automotive windshield wiper system. In this system it is desirable to park, or stop the wipers precisely at the bottom of the windshield. In wiper systems dynamic braking is, generally, used to stop the motor quickly at the desired parking position. Dynamic braking of a DC permanent magnet motor is accomplished by removing power then shorting the motor terminals together. This shorts out the motor back EMF causing a current flow in a direction that effectively reverses the motor during braking. The effect of reversing the motor is to reduce the speed much more quickly than simply letting the motor coast to a stop. As the motor slows down the reversing current reduces until it becomes zero when the motor stops. This is why the motor never actually runs backwards even though the reversing current is applied.

Figure 1:
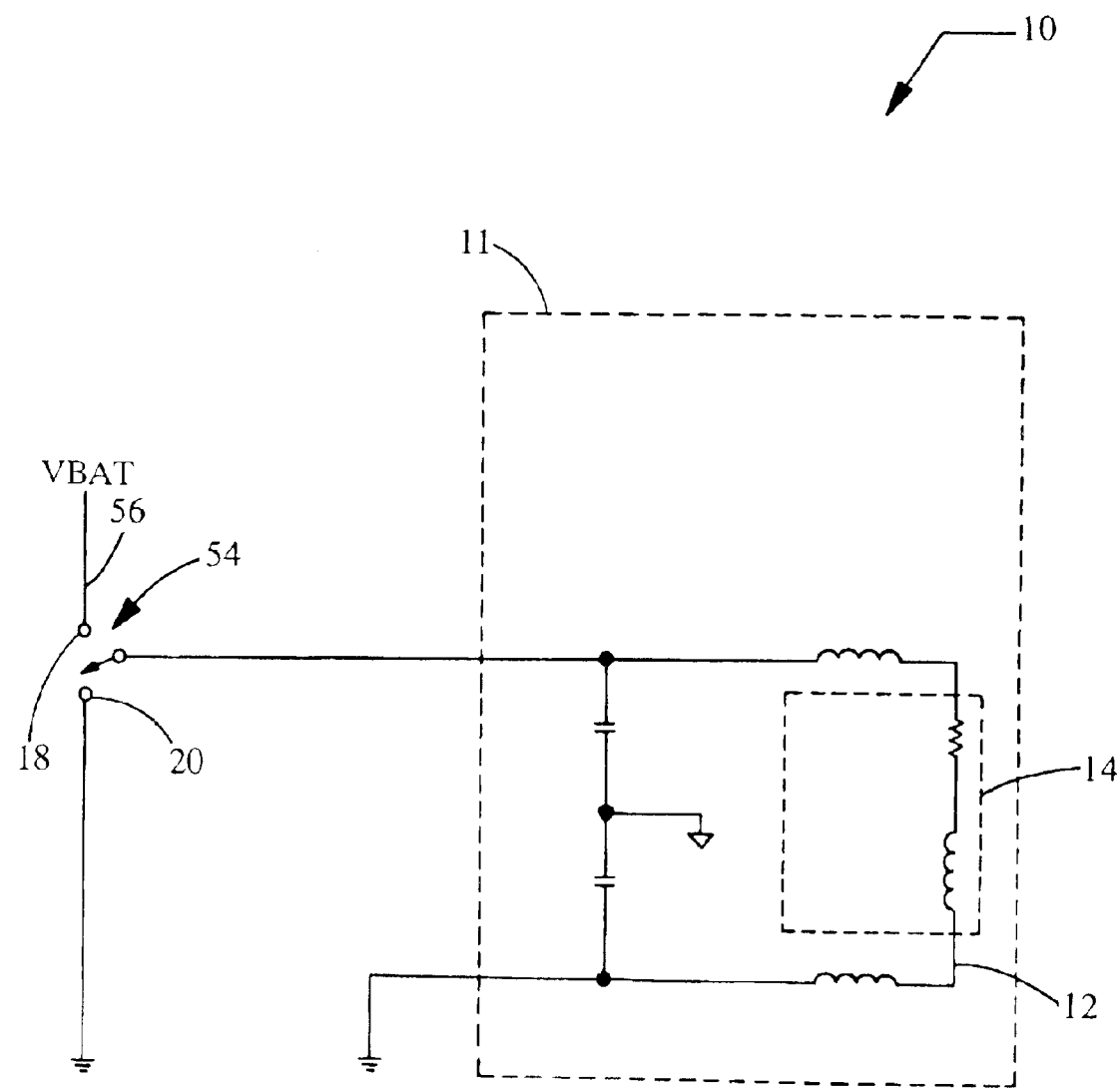
FIG. 1 is a circuit schematic of a prior art braking circuit using a relay.

A typical (prior art) motor control circuit 10 of this type is shown in FIG. 1. A Motor 14 and associated conditioning circuitry is typically mounted on a wiper motor and brush card 11 in the wiper motor application. Since one side 12 of motor 14 is usually grounded a single pole double throw (Form C) relay 54, as shown in FIG. 1, is often used to both run and brake motor 14. Typically the N/O (Normally Open) contact 18 is used to provide power to run motor 14, since this assures that motor 14 is powered off and parked in the default state. In this configuration the relay coil must be energized to run motor 14. The N/C (Normally Closed) contact 20 of relay 54 is pulled in and held closed by a spring whereas N/O contact 18 is pulled and held closed by the force of an electromagnet. Unlike the spring force on N/C contact 20 the electromagnetic force increases as the contacts near each other resulting in much less bounce on N/O contact 18 than seen on the N/C contact 20. Therefore, even though the inductance of the load and the peak current being switched are very similar during both running and braking, the additional bouncing of N/C contact 20 results in repeated interruption of the inductive load later in the braking cycle than seen in operation of the N/O contact 18. This causes additional N/C contact 20 arcing, pitting and material transfer that is not experienced by N/O contact 18. Due to this added wear and tear N/C contact 20 generally fails much sooner than N/O contact 18 in this type of circuit design. This may not be a problem in applications where relay 54 is only expected to operate 100K times or less. However in some intermittent wiper applications several times this number of operations are expected over the life of the vehicle. Alternatively, a discrete half bridge semiconductor design can be used to eliminate relay 54. This can provide the needed reliability but is often more costly due to thermal issues associated with both running and stalled motor conditions as well as additional circuitry needed to prevent half bridge shoot through.

Figure 2:
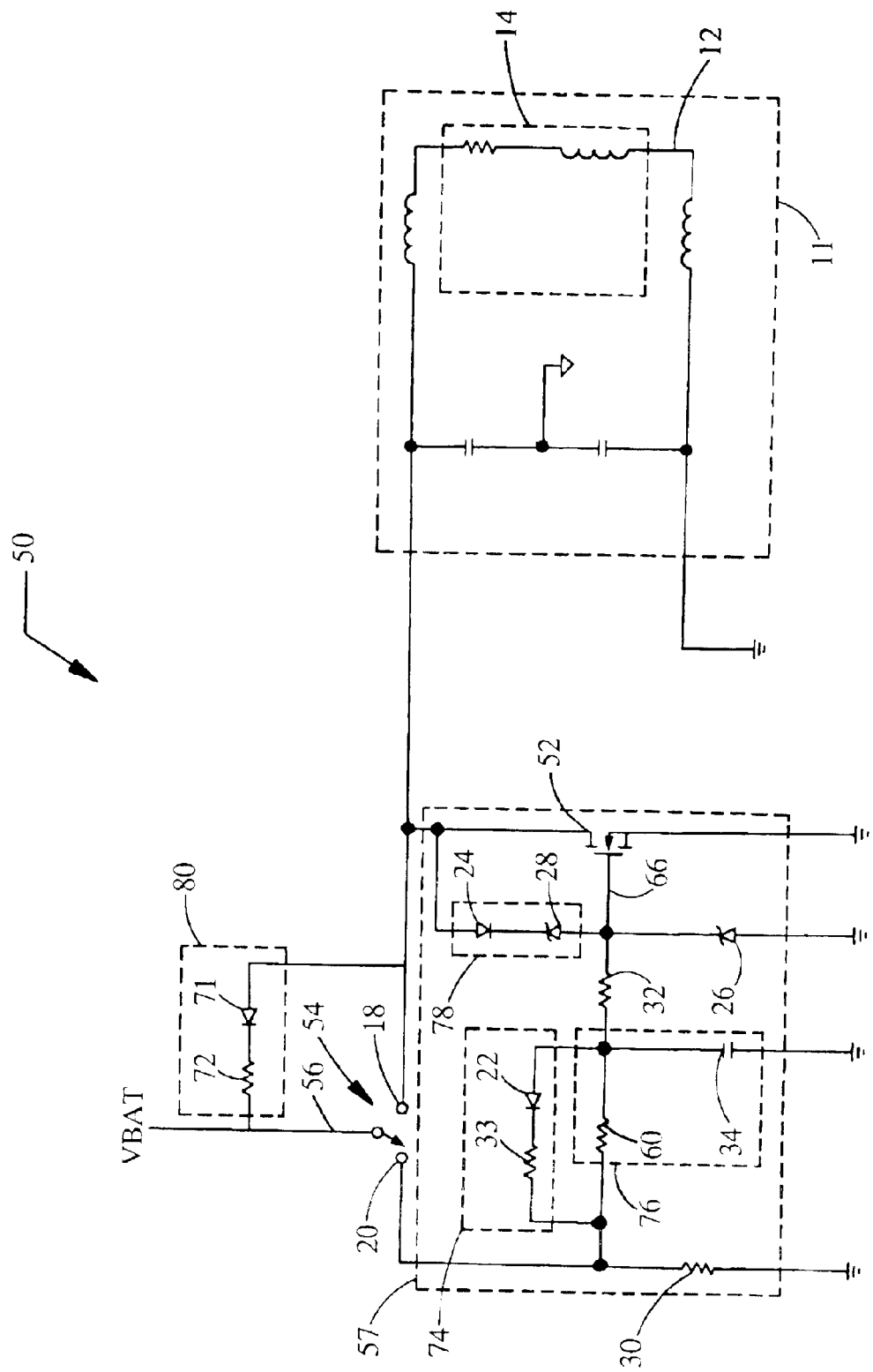
FIG. 2 is a circuit schematic of a braking FET circuit in accordance with the present invention.

In an embodiment of the present invention, a braking FET circuit 50 is provided, as shown in FIG. 2, and described hereinafter. Braking FET circuit 50 uses a hybrid approach, in which a field effect transistor (FET) 52 is used to switch the braking current, and relay 54 is used to provide the running and stalled motor current. This approach eliminates the N/C contact 20 degradation due to arcing and material transfer caused by relay bounce and does not present the thermal management and shoot through issues associated with half bridge designs. Simplified Braking FET circuit designs based on the same topology are possible depending on system and relay characteristics. These simplifications will be described throughout this patent by describing components as optional.

The operation of braking FET circuit 50, as shown in FIG. 2, is as follows. Relay 54 is used to switch battery power 56 to either motor 14 or a braking FET circuit 57. When relay 54 is not energized normally closed contact 20 is closed and the motor 14 is stopped, in this position a FET 52, provided in circuit 57, is energized but will only carry current if motor 14 is spinning. When relay 54 is energized N/C contact 20 is opened and after a short delay N/O contact 18 is closed providing power to run motor 14. This is referred herein as the run mode. In the run mode, relay 54 operates exactly as it does in prior art circuit 10, shown in FIG. 1. When relay 54 is de-energized while motor 14 is running N/O contact 18 is opened removing power to the motor and after a short delay the N/C contact 20 is closed. Voltage is, thus, applied to gate 66 of FET 52, turning FET 52 on to brake motor 14. When FET 52 is on, the FET shorts motor 14 terminals together resulting in dynamic braking of motor 14. Since N/C contact 20 of relay 54 drives gate 66 of FET 52 through resistors 32 and 60 the load seen by relay 54 is primarily resistive. Therefore, arcing, material transfer and pitting of N/C relay contact 20 is eliminated in this design. All electrical and mechanical energy stored in motor 14 is dissipated by FET 52 and motor's internal resistance. It is noteworthy, that there is an inherent delay in the relay as the movable contact traverses the contact gap. Because of this delay the N/C contact 20 is guaranteed to open before the N/O contact 18 closes. This ensures that FET 52 will not be turned on while power is applied to motor 14 through N/O contact 18. Therefore the use of relay 54 to control FET 52 provides inherent shoot-through protection so long as the turn off delay of the FET does not become excessive. Table 1 below lists components used in an embodiment of braking FET circuit 50 of the present invention. Further, the function of these components are specified as well as their necessity for use in the preferred embodiment of the present invention in Table 1.

TABLE 1

| Component | Function | Comment |
| --- | --- | --- |
| Relay 54 | Relay switch motor/braking circuit. | preferable |
| FET 52 | FET braking device. | preferable |
| Diode 24 | Prevents gate turn off when FET 52 is enhanced. | preferable |
| Zener diode 26 | Prevents excessive FET 52 gate voltage. | preferable |
| Zener diode 28 | Sets active clamp voltage. | preferable |
| Resistor 30 | FET 52 gate pull down resistor. | preferable |
| Resistor 60 | FET 52 gate filter resistor. | preferable |
| Resistor 32 | Prevents gate oscillation/limits current through diodes 24 and 28 | preferable |
| Capacitor 34 | FET 52 gate filter capacitor. | preferable |
| Diode 22 | Allows faster FET turn off. | optional |
| Resistor 33 | allows faster FET 52 turn off. | optional |
| Diode 71 | Provides open battery fault protection circuit | optional |
| Resistor 72 | Provides open battery fault protection circuit | optional |

With continuing reference to FIG. 2, the present embodiment provides a filter circuit 76, a voltage limiting circuit 78, a deactivation circuit 74, and a fault protection circuit 80. The filter circuit 76 provides a resistor 60 and a capacitor 34 to filter the signal to the gate of the field of effect transistor. The voltage limiting circuit 78 includes two diodes 24, 28 connected in electrical series. The anode of zener diode 28 connected to the gate of FET 52 while the cathode of zener diode 28 is connected to the cathode of diode 24. The anode of diode 24 is connected to motor terminal 18. The voltage limiting circuit prevents the drain to source voltage of the FET 52 from exceeding its breakdown voltage. Additionally, Zener diode 26 is connected between the FET gate 66 and ground to prevent excessive gate voltage. The resister 32 limits the current through the two Zener diodes 26, 28 and prevents gate oscillation.

The deactivation circuit 74 includes a diode 22 and a resistor 33 in electrical series connection. The deactivation circuit allows the FET 52 to turn off faster. The fault protection circuit 80 includes a diode 71 and a resistor 72 in electrical series connection between the motor terminal 18 and the voltage source. The fault protection circuit 80 provides open battery fault protection. The filter circuit 76, voltage limiting circuit 78, deactivation circuit 74, and fault protection circuit 80 are preferably used when the motor braking switch is a FET, however, they can be used in cooperation with other embodiments.

Experimental results showed that relay 54 durability was increased dramatically using the braking FET circuit 50. Relay 54's life is now well over 500K cycles and limited primarily by mechanical wear out of the relay instead of contact sticking and erosion. The braking FET circuit 50 makes use of the low cost and low voltage drop characteristics of relay 54 in the power switching operation and the durability and robustness of a FET in the braking operation. By combining the best aspects of both technologies the braking FET circuit 50 allows a cost effective solution that is optimized for the control of permanent magnet motors in applications such as wiper motors. A side benefit of the braking FET circuit 50 is the elimination of electromagnetic interference related to arcing of the N/C contact. Therefore the present invention has many advantages over the prior art.

As any person skilled in the art of electrical design will recognize from the previous detailed description and from the figures and claims, modifications and changes can be made to the preferred embodiments of the invention without departing from the scope of this invention defined in the following claims.

What is claimed is:

1. A circuit for controlling a motor's operation, the motor including a first and second motor terminal, the circuit comprising:
   a relay for selectively interconnecting a voltage source with a braking terminal and the first motor terminal;
   a motor braking circuit electrically connected to the braking terminal, the motor braking circuit having a semiconductor switch device connected to the first motor terminal and braking terminal, wherein the semiconductor switch device is activated to brake the motor when the relay interconnects the voltage source with the braking terminal;
   a filter circuit interconnected between the voltage source and the semiconductor switch device; and
   a deactivation, circuit in parallel electrical connection with the filter circuit for switching the semiconductor switch from an on state to an off state.

2. The circuit of claim 1, wherein the second motor terminal is connected to the electrical ground.

3. The circuit of claim 1, wherein the relay is a form C relay.

4. The circuit of claim 1, wherein a control input of the semiconductor switch device is selectively connected to the voltage source and to the electrical ground.

5. The circuit of claim 1, wherein the filter circuit includes a resister in electrical series connection with the brake switch and a capacitor in parallel connection with the brake switch.

6. The circuit of claim 1, further comprising a fault protection circuit, in connection with the first motor terminal and the voltage source.

7. The circuit of claim 6, wherein the fault protection circuit includes a diode and a resistive load, wherein the diode and the resistive load are in electrical series connection between the first motor terminal and the voltage source.

8. The circuit of claim 1, wherein the semiconductor switch device is a field effect transistor, the field effect transistor having a gate, a drain, and a source.

9. The circuit of claim 8, wherein the gate of the field effect transistor is selectively connected to the voltage source and to the electrical ground.

10. The circuit of claim 8, wherein the drain of the field effect transistor is connected to the first motor terminal.

11. The circuit of claim 8, wherein the source of the field effect transistor is connected to the electrical ground.

12. The circuit of claim 8, further comprising a first diode, in electrical connection with the first motor terminal and the gate to prevent deactivation of the field effect transistor.

13. The circuit of claim 8, further comprising a voltage limiting circuit for setting an active clamp voltage for the field effect transistor and preventing excessive source to drain voltage for the field effect transistor.

14. The circuit of claim 13, wherein the voltage limiting circuit includes two diodes connected in electrical series connection between the first motor terminal and the gate.

15. The circuit of claim 8, further comprising a filter circuit interconnected between the voltage source and the motor brake switch.

16. The circuit of claim 1, wherein the deactivation circuit includes a diode and a resistive load, the diode is in electrical series connection with the resistive load.

* * * * *

UNITED STATES PATENT AND TRADEMARK OFFICE
CERTIFICATE OF CORRECTION

PATENT NO. : 6,876,163 B2
DATED : April 5, 2005
INVENTOR(S) : Gary E. Zack et al.

It is certified that error appears in the above-identified patent and that said Letters Patent is hereby corrected as shown below:

<u>Column 6,</u>
Line 3, immediately after "deactivation" delete "," (comma).

Signed and Sealed this

Eighteenth Day of October, 2005

JON W. DUDAS
*Director of the United States Patent and Trademark Office*